S. A. BRUMBAUGH.
Coupling for Soft-Metal Pipe and Hose.

No. 199,784. Patented Jan. 29, 1878.

WITNESSES:
H. Rydquist
J. H. Scarborough

INVENTOR:
S. A. Brumbaugh.
BY Munn &Co
ATTORNEYS.

UNITED STATES PATENT OFFICE.

SAMUEL A. BRUMBAUGH, OF HARRISBURG, PENNSYLVANIA, ASSIGNOR TO HIMSELF AND GEORGE J. BOLTON, OF SAME PLACE.

IMPROVEMENT IN COUPLINGS FOR SOFT-METAL PIPES AND HOSE.

Specification forming part of Letters Patent No. 199,784, dated January 29, 1878; application filed September 22, 1877.

*To all whom it may concern:*

Figure 1:
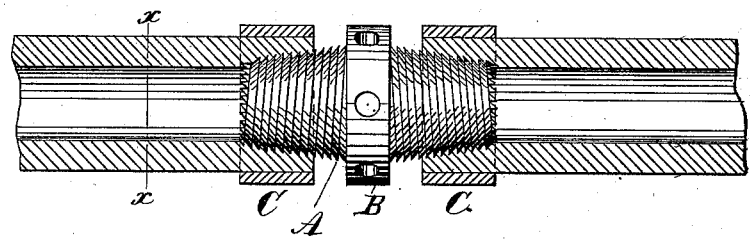
Figure 2:
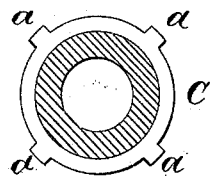
Figure 3:
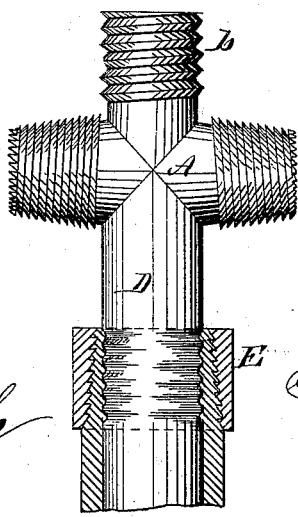

Be it known that I, SAMUEL A. BRUMBAUGH, of Harrisburg, in the county of Dauphin and State of Pennsylvania, have invented a new and Improved Coupling for Soft-Metal Pipes and Hose, of which the following is a specification:

Figure 1 is a longitudinal section. Fig. 2 is a transverse section on line $x\ x$, Fig. 1; and Fig. 3 represents the improvements applied to a T-joint.

Similar letters of reference indicate corresponding parts.

My invention relates to a coupling especially adapted to soft-metal pipes and hose; and it consists of a short tube having conical ratchet-threaded ends, and having a collar in which a number of holes are drilled for receiving a spanner.

In the drawings, A is a tube, having a central collar, B, from which it tapers each way toward the ends. Upon one end of the tube there is a right-hand ratchet-thread, and upon the other end a left-hand ratchet-thread is formed. The ends of the tube are serrated to form cutters, which cut away the metal of the pipe into which the coupling is screwed, so as to partly form the thread, which is afterward completed by the larger portion of the tube as it is screwed into the pipe. The collar B is drilled to receive the nib of a spanner or wrench. Ferrules C, having lugs $a$, are placed on the ends of the pipes to be coupled, to re-enforce them and prevent them from expanding as the coupling is screwed in.

The lugs $a$ are designed for receiving a double wrench or pair of pipe-tongs, which prevent the ends of the pipes being coupled from turning while the tube is screwed in.

When a T-joint is made, the collar B is dispensed with, and a nipple, D, is joined to the pipe A at right angles. The external diameter of the nipple corresponds with the internal diameter of the pipe to be connected with it. The end of the nipple is ribbed or corrugated, and the joint is formed by screwing over the end of the pipe placed on the nipple a ferrule, E, the bore of which is tapered and provided with a ratchet screw-thread. The ferrule is provided with external lugs for convenience in turning.

The joint is made by placing the pipe over the nipple D and screwing upon it the ferrule E, which contracts the end of the pipe, and forces it down upon the ribs or corrugations of the nipple.

The tube A may have a nipple, $b$, formed on it for receiving a bib or ordinary coupling.

Having thus described my invention, I claim as new and desire to secure by Letters Patent—

A coupling for pipes and hose formed of a short tube, whose conical ends are ratchet-threaded to the right and left, the middle being provided with a collar, apertured to receive the spanner, as shown and described.

SAMUEL A. BRUMBAUGH.

Witnesses:
GEO. M. HOPKINS,
GOTTL. NOTTIN.